(12) United States Patent
Miyakoshi

(10) Patent No.: US 7,191,055 B2
(45) Date of Patent: Mar. 13, 2007

(54) EVALUATION METHOD OF DIAGNOSTIC FUNCTION FOR A VARIABLE VALVE MECHANISM AND EVALUATION APPARATUS FOR A VARIABLE VALVE MECHANISM

(75) Inventor: Ryo Miyakoshi, Iseaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/272,876

(22) Filed: Nov. 15, 2005

(65) Prior Publication Data
US 2006/0106528 A1 May 18, 2006

(30) Foreign Application Priority Data
Nov. 18, 2004 (JP) ............................. 2004-334726

(51) Int. Cl.
*G01M 15/04* (2006.01)
(52) U.S. Cl. ...................................... 701/114; 73/118.1
(58) Field of Classification Search ..................... None
See application file for complete search history.

(56) References Cited

U.S. PATENT DOCUMENTS
6,999,868 B2 * 2/2006 Funke et al. ................. 701/114

FOREIGN PATENT DOCUMENTS
| JP | 10-153104 A | 6/1998 |
|----|----|----|
| JP | 2000-73794 A | 3/2000 |
| JP | 2001-12262 A | 1/2001 |
| JP | 2001-164951 A | 6/2001 |

* cited by examiner

*Primary Examiner*—Andrew M. Dolinar
(74) *Attorney, Agent, or Firm*—Foley & Lardner LLP

(57) ABSTRACT

Evaluation of a diagnosis function for diagnosing a transient response of a variable valve mechanism for an engine valve is executed in a manner such that a desired value on the variable valve mechanism is calculated based on testing signals of a rotating speed and a water temperature, that a controlled variable signal for testing indicating a state in which the transient response of the variable valve mechanism is delayed, is generated, and that the diagnostic function for the transient response is evaluated based on whether or not the delay of the transient response is diagnosed on the basis of a correlation between the desired value and a controlled variable signal.

22 Claims, 9 Drawing Sheets

EVALUATION METHOD OF DIAGNOSTIC FUNCTION FOR A VARIABLE VALVE MECHANISM AND EVALUATION APPARATUS FOR A VARIABLE VALVE MECHANISM

BACKGROUND OF THE INVENTION

1. Field of the Invention

The present invention relates to a method of and an apparatus for evaluating a function for diagnosing a transient response of a variable valve mechanism adapted for changing operating characteristics of an engine valve.

2. Description of the Related Art

Japanese Unexamined Patent Publication No. 2000-073794 discloses a technique in which a deviation between a desired value and an actual value of the operating characteristics of the engine valve is calculated, and when a state where the deviation exceeds a determination value continues for a time period equal to or more than a predetermined time period, an occurrence of response delay in the variable valve mechanism is diagnosed.

If the diagnosing processing normally functions, it is possible to warn or alert a driver about such an abnormal condition that the response delay is increased. However, if the diagnosing processing does not function normally, the engine must be operated under a condition that a large response delay occurs and thus, performance at the time of acceleration of the engine accompanying changeover of desired operating characteristics of the engine valve is deteriorated.

SUMMARY OF THE INVENTION

Hence, it is an object of the present invention to make it possible to evaluate whether or not the diagnosis of a response delay in the variable valve mechanism, which changes the operating characteristics of an engine valve, functions normally, thereby enhancing the reliability of the diagnosis of the response delay.

To achieve the above object, in accordance with the present invention, a test signal for reproducing a state in which the transient response of the variable valve mechanism is delayed is generated, a function of diagnosis is executed to diagnose the transient response of the variable valve mechanism in the reproduced state in which the transient response is delayed based on the test signal, and the diagnostic function of the transient response is evaluated based on a result of the diagnosis.

The other objects and features of this invention will become understood from the following description with reference to the accompanying drawing.

DESCRIPTION OF THE PREFERRED EMBODIMENTS

Figure 1:
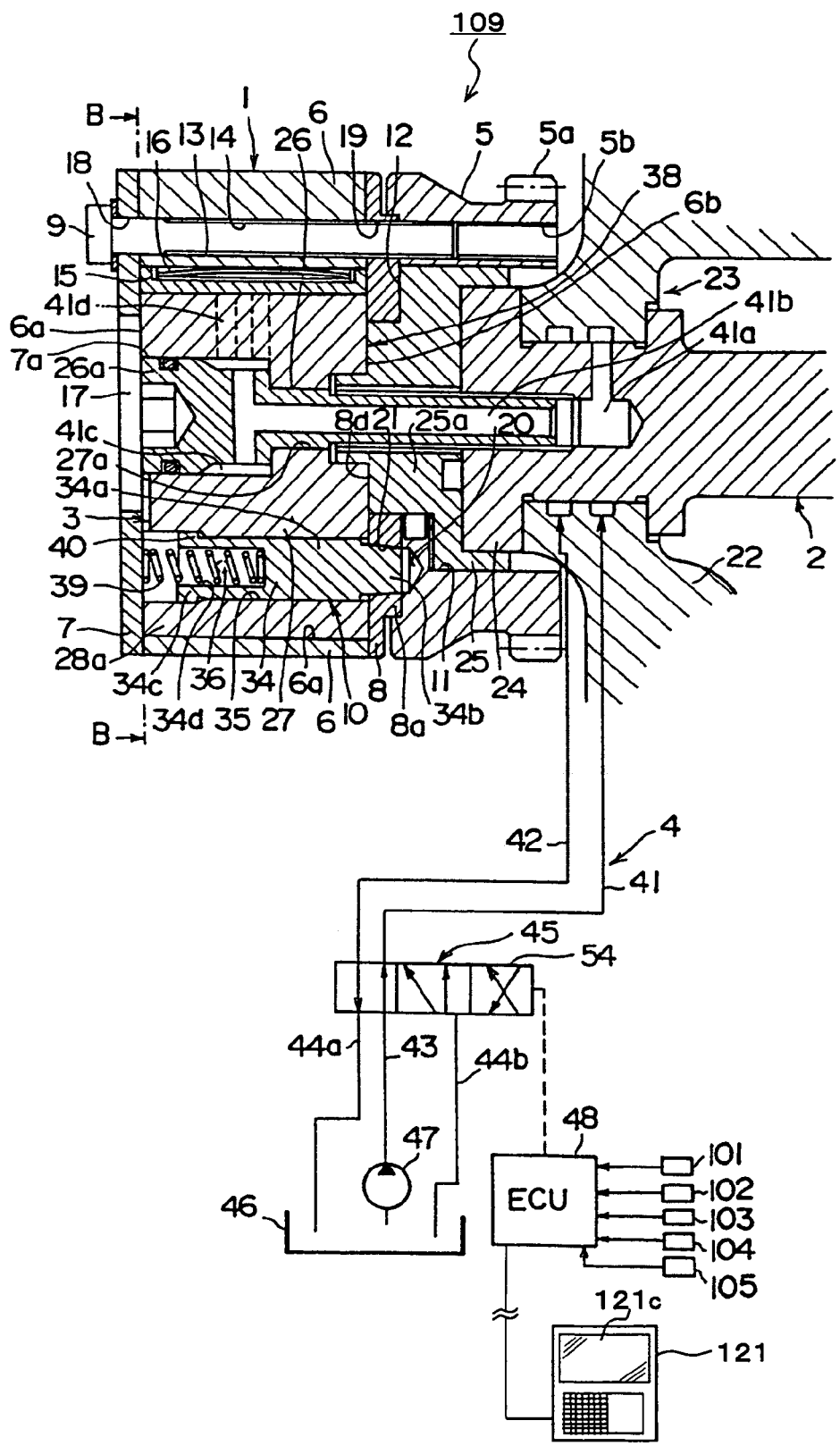
FIG. 1 is a cross-sectional view showing a variable valve timing apparatus in an embodiment of the present invention.
Figure 2:
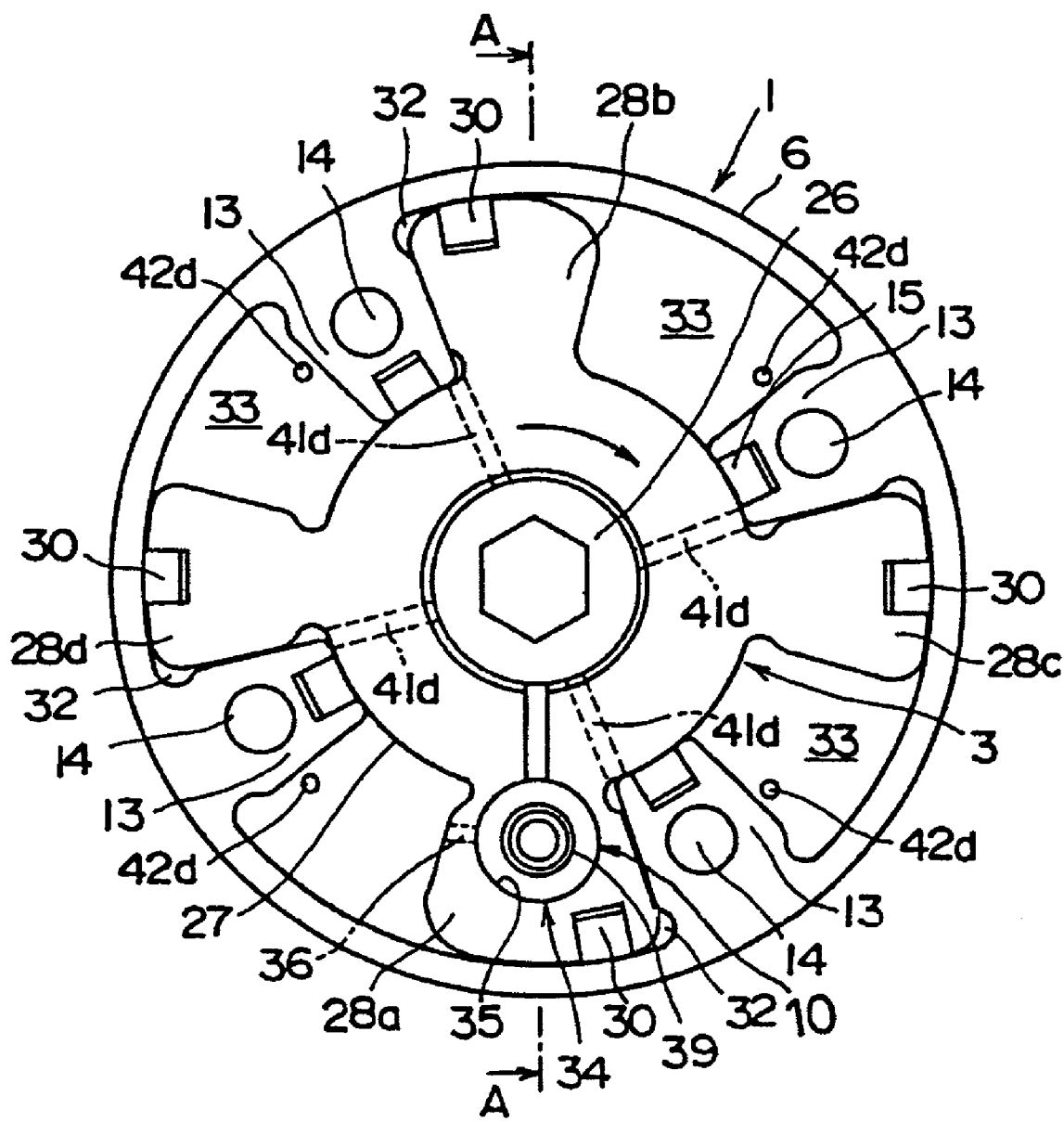
FIG. 2 is a cross-sectional view taken along the line B—B in FIG. 1.
Figure 3:
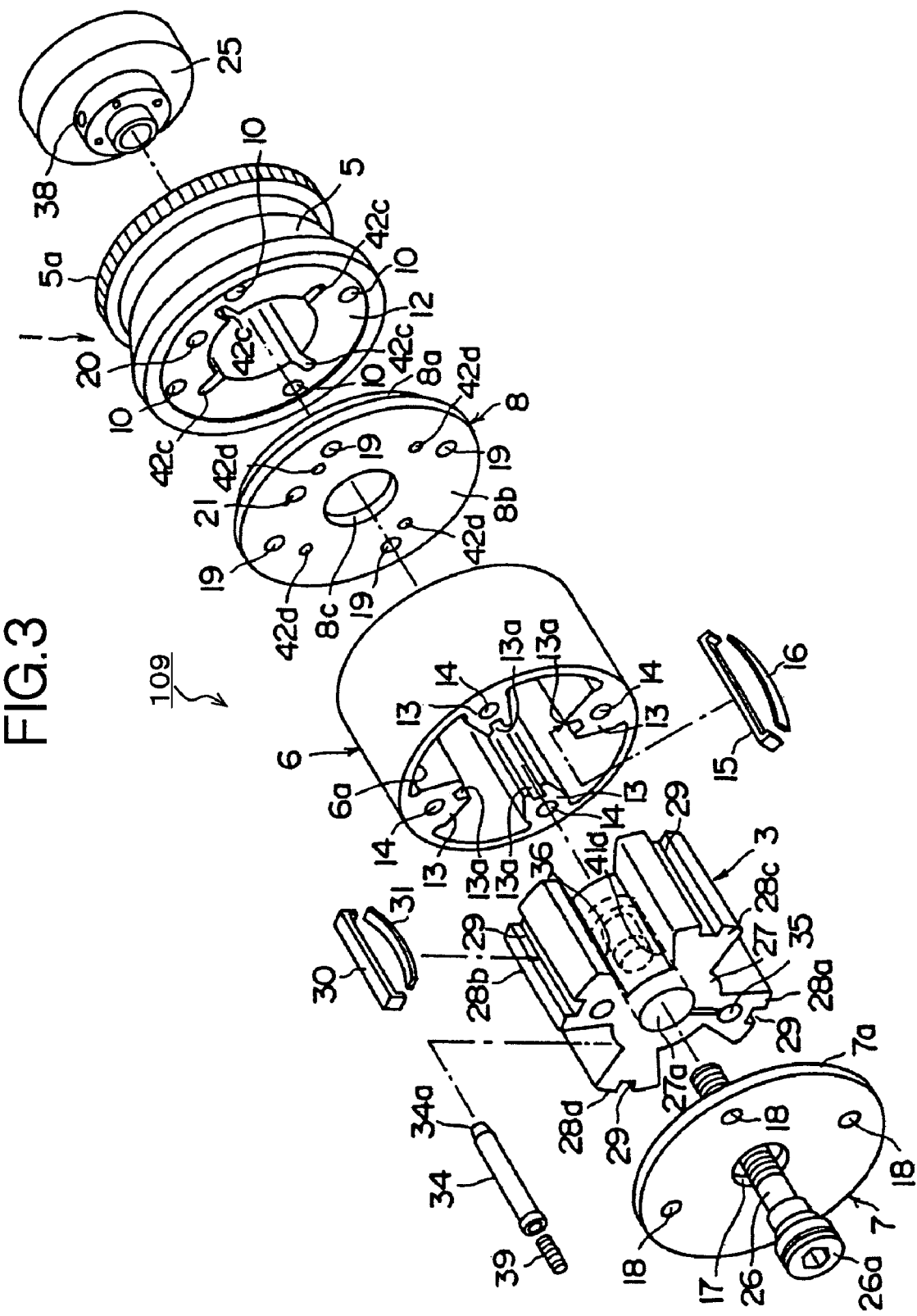
FIG. 3 is an exploded perspective view of the variable valve timing apparatus.

FIGS. 1 through 6 show variable valve timing apparatus 109 as a variable valve mechanism of the embodiment, and variable valve timing apparatus 109 is applied to an intake valve side in a vehicular internal combustion engine.

The illustrated variable valve timing apparatus 109 includes cam sprocket 1 which is rotated by a crankshaft (not shown) of the engine through a timing chain, camshaft 2 provided such that camshaft 2 can rotate relative to cam sprocket 1, rotation member 3 which is fixed to an end of camshaft 2 and rotatably accommodated in cam sprocket 1, hydraulic circuit 4 for rotating rotation member 3 relative to cam sprocket 1, and lock mechanism 10 for selectively locking a relative rotation position between cam sprocket 1 and rotation member 3 at a predetermined position.

Cam sprocket 1 includes rotation member 5 provided at its outer periphery with teeth 5a with which the timing chain meshes, housing 6 which is disposed in front of rotation member 5 and in which rotation member 3 is rotatably accommodated, front cover 7 for closing a front end opening of housing 6, and rear cover 8 which is disposed between housing 6 and rotation member 5 for closing a rear end of housing 6. These rotation member 5, housing 6, front cover 7 and rear cover 8 are integrally couple to each other from an axial direction by means of four small-diameter bolts 9.

Rotation member 5 is of substantially annular shape. Four female thread holes 5b are formed in rotation member 5 such as to penetrate rotation member 5 in its longitudinal direction at equal distances of about 90° in the circumferential direction from one another. Small-diameter bolts 9 are threadedly engaged in female thread holes 5b. Fitting hole 11 whose diameter is changed in a stepwise manner is formed in rotation member 5 at its central position such as to penetrate rotation member 5. Later-described sleeve 25 for constituting a passage is fitted into fitting hole 11.

Rotation member 5 is formed at its front surface with circular fitting groove 12 into which rear cover 8 is fitted.

Housing 6 is of cylindrical shape whose front and rear ends are opened. Four division walls 13 radially internally project from an inner peripheral surface of housing 6 at positions spaced apart 90° from one another in the circumferential direction.

Each of division walls 13 has a trapezoidal cross-section and is provided to extend along the axial direction of housing 6. Both end edges of division wall 13 are flush with both end edges of housing 6, and four through-holes 14 for allowing insertion of bolts are formed in a base end of division wall 13 such as to penetrate through division wall 13 in the axial direction. Small-diameter bolts 9 are inserted into bolt-through holes 14.

A central portion of an inner end surface of each division wall 13 is notched in the axial direction to form holding groove 13a. U-shaped seal member 15 and leaf spring 16, which pushes seal member 15 inward are fitted into and held in holding groove 13a.

Bolt-through hole 17 having relatively large diameter is formed through front cover 7. Four bolt holes 18 are formed through front cover 7 at locations corresponding to bolt-through holes 14 of housing 6.

Rear cover 8 is provided at its rear end surface with circular plate 8a, which is fitted into and held in fitting groove 12 of rotation member 5. Rear cover 8 is also provided at its central portion with fitting hole 8c. Small-diameter annular portion 25a of sleeve 25 is fitted into fitting hole 8c. Four bolt holes 19 are formed in rear cover 8 at locations corresponding to bolt-through holes 14.

Camshaft 2 is rotatably supported by an upper end portion of cylinder head 22 through cam bearing 23. A cam (not shown) for opening an intake valve is integrally formed on a predetermined position of an outer peripheral surface of camshaft 2 through a valve lifter. Flange portion 24 is also integrally formed on a front end portion of camshaft 2.

Rotation member 3 is fixed to a front end of camshaft 2 by fixing bolt 26 inserted from the axial direction through sleeve 25. A front portion and a rear portion of sleeve 25 are fitted into flange portion 24 and fitting hole 11, respectively. Rotation member 3 is provided at its central portion with annular base portion 27 having bolt-through hole 27a into which fixing bolt 26 is inserted. Four vanes 28a, 28b, 28c and 28d are integrally formed on an outer peripheral surface of base portion 27 at positions spaced apart from one another 90° in the circumferential direction thereof.

Each of first to fourth vanes 28a to 28d has approximately trapezoidal cross-section. First to fourth vanes 28a to 28d are disposed in four recesses between division walls 13, and vanes 28a to 28d divide the respective recesses back and forth in the rotation direction, so that advance angle hydraulic chamber 32 and lag angle hydraulic chamber 33 may be formed in the respective recesses between both sides of respective vanes 28a to 28d and both side surfaces of respective division walls 13.

Central portion of outer peripheral surfaces of vanes 28a to 28d are cut in the axial direction to form notch-like holding grooves 29. U-shaped seal member 30 which comes into slide contact with inner peripheral surface 6a of housing 6, and leaf spring 31 which pushes seal member 30 outward are fitted into and held in holding grooves 29.

Lock mechanism 10 includes engagement groove 20 formed at a predetermined position on an outer periphery of fitting groove 12 of rotation member 5, tapered engagement hole 21 formed in a predetermined position of rear cover 8 corresponding to engagement groove 20, sliding hole 35 formed at the central position of one of vanes 28 along the axial direction corresponding to engagement hole 21, lock pin 34 slidably provided in sliding hole 35 of one vane 28, coil spring 39 which is a spring member compressed on the rear end side of lock pin 34, and pressure receiving chamber 40 formed between lock pin 34 and sliding hole 35.

Lock pin 34 includes central main body 34a having medium diameter, tapered conical engagement portion 34b formed on the tip end side of main body 34a, and stepped stopper portion 34c having large diameter formed on the rear end side of main body 34a.

Lock pin 34 is biased toward engagement hole 21 by a spring force of coil spring 39 compressed between a bottom surface of internal recessed groove 34d of stopper portion 34c and an inner end surface of front cover 7. Pressure receiving chamber 40 is formed between an inner peripheral surface of sliding hole 35 and an outer peripheral surface between main body 34a and stopper portion 34c. Lock pin 34 slides in a direction in which lock pin 34 is pulled out from engagement hole 21 by hydraulic pressure in pressure receiving chamber 40.

Pressure receiving chamber 40 is in communication with lag angle hydraulic chamber 33 by through hole 36 formed in a side of vane 28.

Engagement portion 34b of lock pin 34 is engaged in engagement hole 21 in a turning position of the maximum lag angle side of rotation member 3.

Hydraulic circuit 4 includes two hydraulic pressure passages, i.e., first hydraulic pressure passage 41 for supplying and discharging hydraulic pressure to and from advance angle hydraulic chamber 32, and second hydraulic pressure passage 42 for supplying and discharging hydraulic pressure to and from lag angle hydraulic chamber 33. Supply passage 43 and drain passage 44 are respectively connected to hydraulic pressure passages 41 and 42 through solenoid switching valve 45 operable to switch hydraulic passages.

Supply passage 43 is provided with oil pump 47 for pumping oil in oil pan 46, and a downstream end of drain passage 44 is in communication with oil pan 46.

First hydraulic pressure passage 41 includes first passage portion 41a formed from an interior of cylinder head 22 to an interior of camshaft 2, first oil passage 41b which is branched off in head 26a through fixing bolt 26 in the axial direction and which is in communication with first passage portion 41a, oil chamber 41c which is formed between a small-diameter outer peripheral surface of head 26a and an inner peripheral surface of bolt-through hole 27a formed in base portion 27 of rotation member 3 and which is in communication with first oil passage 41b, and four branch passages 41d which are formed substantially radially in base portion 27 of rotation member 3 and which are in communication with oil chamber 41c and advance angle hydraulic chamber 32.

On the other hand, second hydraulic pressure passage 42 includes second passage portion 42a formed in cylinder head 22 and in one side in camshaft 2, second oil passage 42b which is bent into substantially L-shape in sleeve 25 and which is in communication with second passage portion 42a, four oil passage grooves 42c which are formed in outer peripheral hole of fitting hole 11 of rotation member 5 and which is in communication with second oil passage 42b, and four oil holes 42d which are formed in rear cover 8 away from one another through 90° in the circumferential direction and which bring oil passage groove 42c and lag angle hydraulic chamber 33 into communication.

Solenoid switching valve 45 is provided therein with a spool valve body. The spool valve body relatively switches hydraulic pressure passages 41 and 42, supply passage 43 and drain passages 44a and 44b. Solenoid switching valve 45 is switched by a control signal from engine control unit 48.

Figure 4:
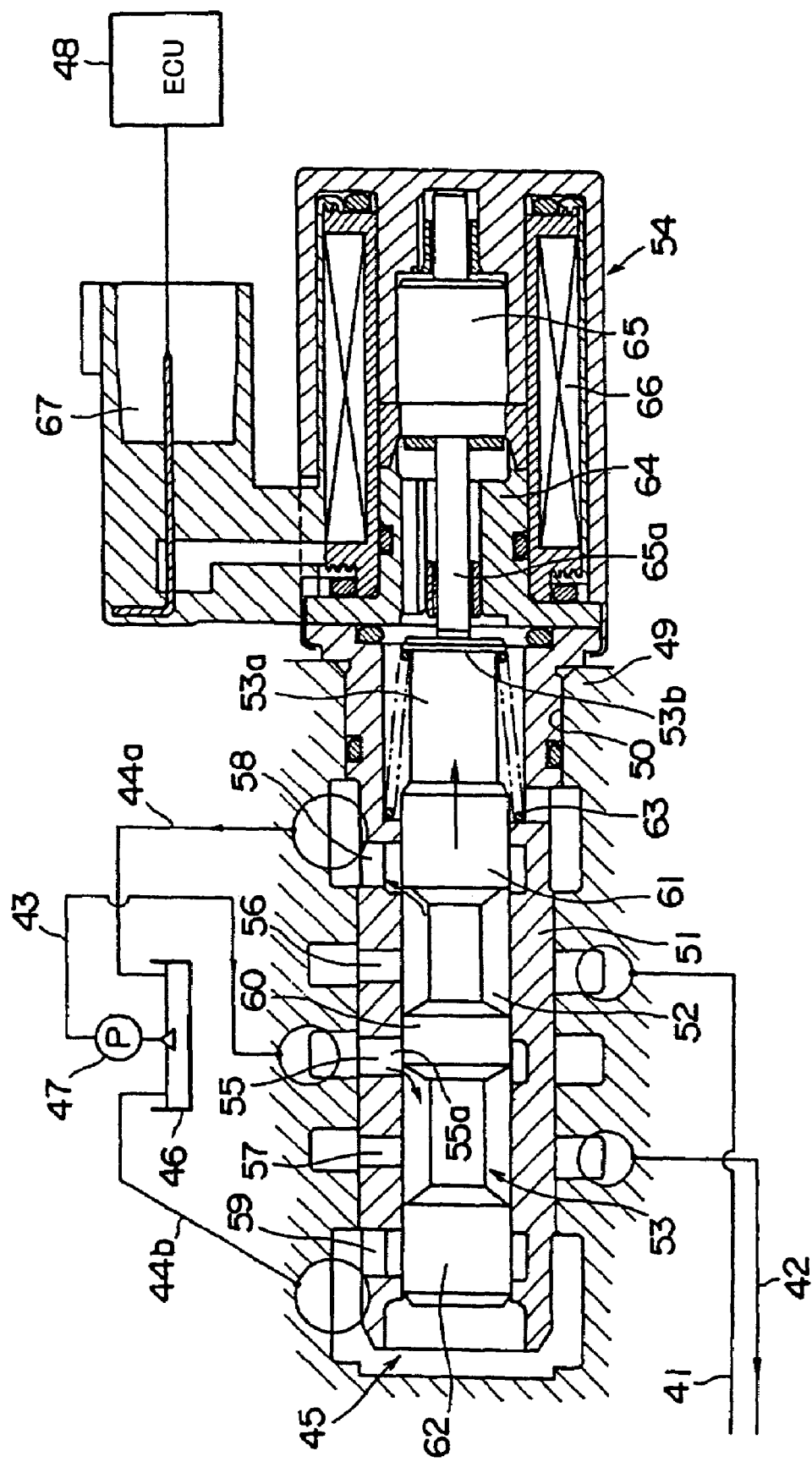
FIG. 4 is a cross-sectional view showing a solenoid switching valve in the variable valve timing apparatus.
Figure 5:
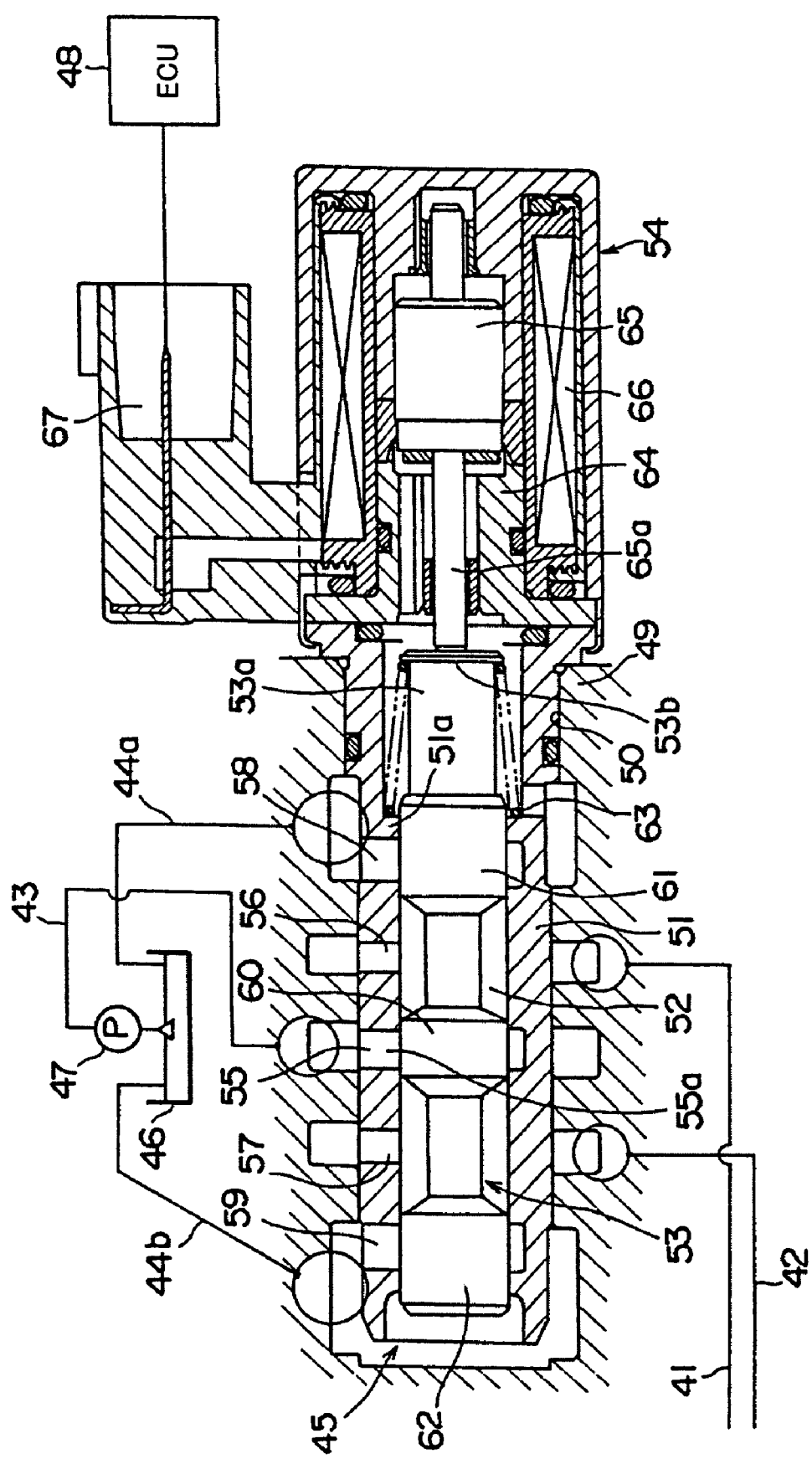
FIG. 5 is a cross-sectional view showing a solenoid switching valve in the variable valve timing apparatus.
Figure 6:
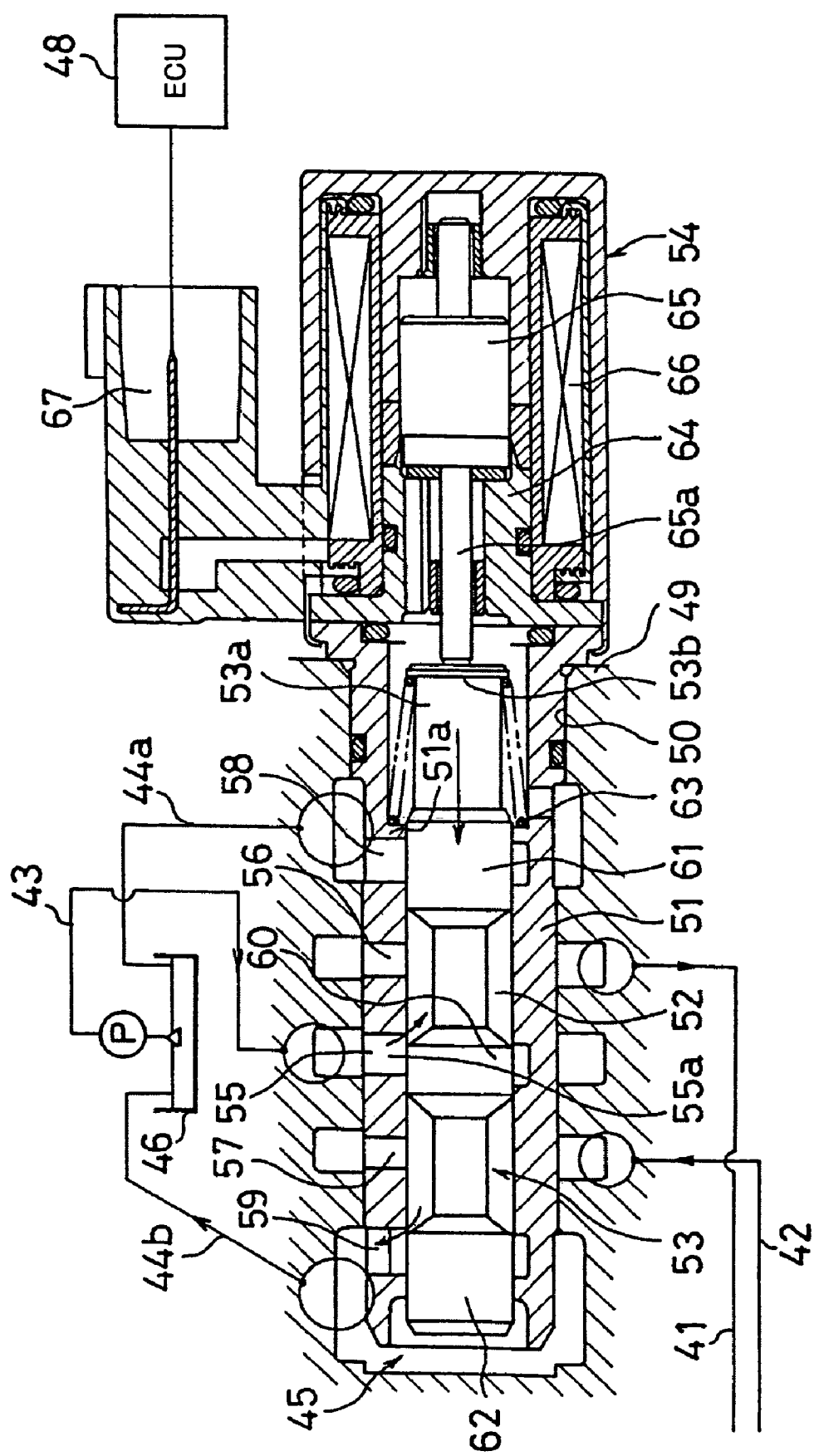
FIG. 6 is a cross-sectional view showing a solenoid switching valve in the variable valve timing apparatus.

More specifically, as shown in FIGS. 4 to 6, solenoid switching valve 45 includes cylindrical valve body 51 which is inserted into and fixed into holding hole 50 of cylinder block 49, spool valve body 53 which is slidably provided in valve hole 52 of valve body 51 and which switches flow path, and proportional solenoid type electromagnetic actuator 54 for operating spool valve body 53.

Supply port 55 is formed into valve body 51 such as to penetrate valve body 51 at substantially central position of peripheral wall. Supply port 55 brings a downstream end of supply passage 43 and valve hole 52 into communication with each other. First port 56 and second port 57 are formed in both sides of supply port 55 such as to penetrate the same. First port 56 and second port 57 bring the other ends of first and second hydraulic pressure passages 41 and 42 and valve hole 52 with each other at both sides of supply port 55.

Third and fourth ports 58 and 59 are formed in both ends of the peripheral wall. Third and fourth ports 58 and 59 bring both drain passages 44a and 44b and valve hole 52 into communication with each other.

Spool valve body 53 has a small diameter shaft, the small diameter shaft is provided at its central portion with a substantially columnar first valve portion 60 which opens and closes supply port 55. The small diameter shaft is also provided at its both ends with substantially columnar second and third valve portions 61 and 62 which open and close third and fourth ports 58 and 59.

Spool valve body 53 is biased rightward in the drawing, i.e., in a direction in which first valve portion 60 brings supply port 55 and second hydraulic pressure passage 42 into communication with each other by means of conical valve spring 63 which is elastically interposed between a bevel portion 53b on one end edge of a front end support shaft 53a and spring sheet 51a of a front end inner peripheral wall of valve hole 52.

Electromagnetic actuator 54 includes core 64, moving plunger 65, coil 66, connector 67 and the like. Driving rod 65a for pushing bevel portion 53b of spool valve body 53 is fixed to a tip end of moving plunger 65.

Engine control unit 48 detects a current operation state (engine load, engine rotating speed) by signals from rotation sensor 101 which detects engine rotating speed, and flow meter 102, which detects intake air amount of the engine. Engine control unit 48 also detects a relative turning position between cam sprocket 1 and camshaft 2 by signals from crank angle sensor 103 and cam sensor 104, i.e., detects rotation phase of camshaft 2 with respect to crankshaft.

Engine control unit 48 controls a quantity of power supply to electromagnetic actuator 54 based on a duty control signal.

For example, if a control signal (OFF signal) of duty ratio of 0% is output to electromagnetic actuator 54 from engine control unit 48, spool valve body 53 is moved to a position shown in FIG. 4 by a spring force of valve spring 63 in the most rightward direction.

With this, first valve portion 60 opens opening end 55a of supply port 55, brings the same into communication with second port 57, and second valve portion 61 opens an opening end third port 58 and fourth valve portion 62 closes fourth port 59 at the same time.

Thus, working oil pumped from oil pump 47 is supplied to lag angle hydraulic chamber 33 through supply port 55, valve hole 52, second port 57 and second hydraulic pressure passage 42, and working oil in advance angle hydraulic chamber 32 is discharged into oil pan 46 from first drain passage 44a through first hydraulic pressure passage 41, first port 56, valve hole 52 and third port 58.

Therefore, internal pressure in lag angle hydraulic chamber 33 becomes high, internal pressure in advance angle hydraulic chamber 32 becomes low, and rotation member 3 is rotated in the maximum one direction through vanes 28a to 28b.

With this, cam sprocket 1 and camshaft 2 are relatively turned toward one side and phase is varied and as a result, opening timing of intake valve is delayed, and overlap of exhaust valve is reduced.

On the other hand, if a control signal (ON signal) of duty ratio of 100% is output from engine control unit 48 to electromagnetic actuator 54, spool valve body 53 slides leftward at the maximum as shown in FIG. 6 against a spring force of valve spring 63, third valve portion 61 closes third port 58 and at the same time, fourth valve portion 62 opens fourth port 59, and first valve portion 60 brings supply port 55 and first port 56 into communication with each other.

Thus, working oil is supplied into advance angle hydraulic chamber 32 through supply port 55, first port 56 and first hydraulic pressure passage 41, working oil in lag angle hydraulic chamber 33 is discharged into oil pan 46 through second port 57, fourth port 59 and second drain passage 44b, and pressure in lag angle hydraulic chamber 33 is reduced.

Therefore, rotation member 3 rotates in the other direction at the maximum through vanes 28a to 28d and with this, cam sprocket 1 and camshaft 2 relatively turn toward the other side and their phases are varied and as a result, opening timing of the intake valve is advanced (led), and overlap with respect to the exhaust valve is increased.

In engine control unit 48, duty ratio at which first valve portion 60 closes supply port 55, third valve portion 61 closes third port 58, and fourth valve portion 62 closes fourth port 59 is set as base duty ratio BASEDTY, and on the other hand feedback correction amount UDTY for bringing rotation phases of cam sprocket 1 and camshaft 2 which are detected based on signals from crank angle sensor 103 and cam sensor 104, and desired value (desired advance angle value) of the rotation phase which is set in accordance with the operation state to be matched with each other.

The sum of base duty ratio BASEDTY and feedback correction amount UDTY is defined as a final duty ratio VTCDTY, and a control signal of this duty ratio VTCDTY is output to electromagnetic actuator 54.

Base duty ratio BASEDTY is set to substantially intermediate value (e.g., 50%) on a duty ratio range where supply port 55, third port 58 and fourth port 59 are closed, and oil is not supplied to any of hydraulic chambers 32 and 33.

That is, when it is necessary to change the rotation phase toward the lag angle, the duty ratio is reduced by the feedback correction amount UDTY, working oil pumped from oil pump 47 is supplied to lag angle hydraulic chamber 33, and working oil in advance angle hydraulic chamber 32 is discharged into oil pan 46.

When it is necessary to change the rotation phase toward the advance angle, the duty ratio is increased by the feedback correction amount UDTY, working oil pumped from oil pump 47 is supplied to advance angle hydraulic chamber 32, and working oil in lag angle hydraulic chamber 33 is discharged into oil pan 46.

When the current state of the rotation phase is to be held, control is performed such that the duty ratio is returned to a value close to the base duty ratio by reducing the absolute value of feedback correction amount UDTY, supply port 55 and third port 58 are closed (supply of hydraulic pressure is stopped) to hold the internal pressure of hydraulic chambers 32 and 33.

Engine control unit 48 has a function for performing feedback control of the duty ratio of a duty control signal which is output to electromagnetic actuator 54 by controlling proportion, integration and differentiation based on deviation between desired advance angle value and the actual advance angle value, and a function for diagnosing response delay in variable valve timing apparatus 109.

The diagnosis is carried out based on time required until the actual advance angle value is converged into the desired advance angle value after the desired advance angle value is changed in a step manner, duration of a state in which the deviation between the desired advance angle value and the actual advance angle value is equal to or more than a predetermined value, and changing speed of the actual advance angle value immediately after the desired advance angle value is changed in the step manner.

When it is determined that the response delay is generated as a result of diagnosis of the response delay, a user of the vehicle is alerted to the trouble of variable valve timing apparatus 109 and this alert encourages the user to carry out maintenance of the vehicle.

If the response diagnostic function is not normally functioned, even when the response delay of variable valve timing apparatus 109 is generated, it is not possible to alert the user to the trouble, and the driver drives the vehicle in a state where the operation of the internal combustion engine is deteriorated.

Hence, in this embodiment, it is evaluated whether the response diagnostic function normally functions as will be described below.

Figure 7:
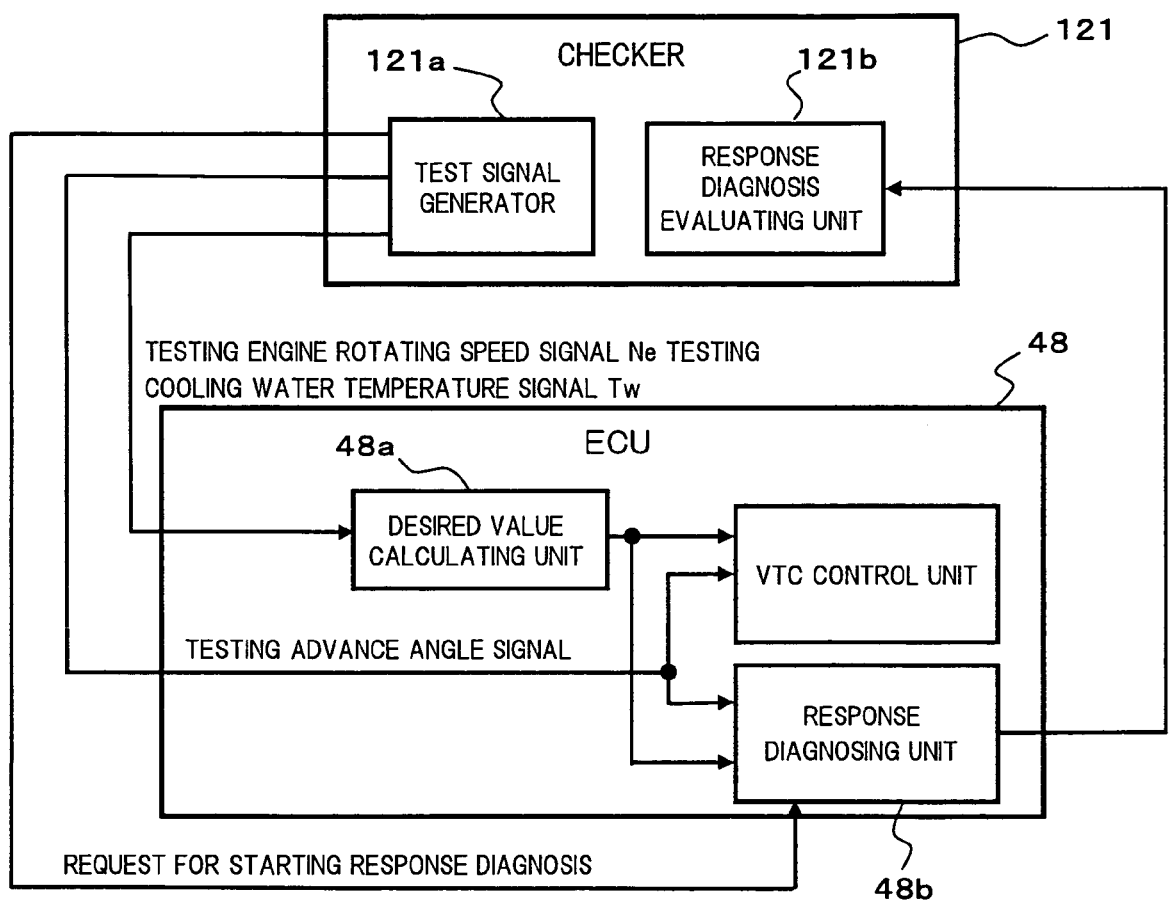
FIG. 7 is a block diagram showing a control function of a checker and an engine control unit in the embodiment.
Figure 8:
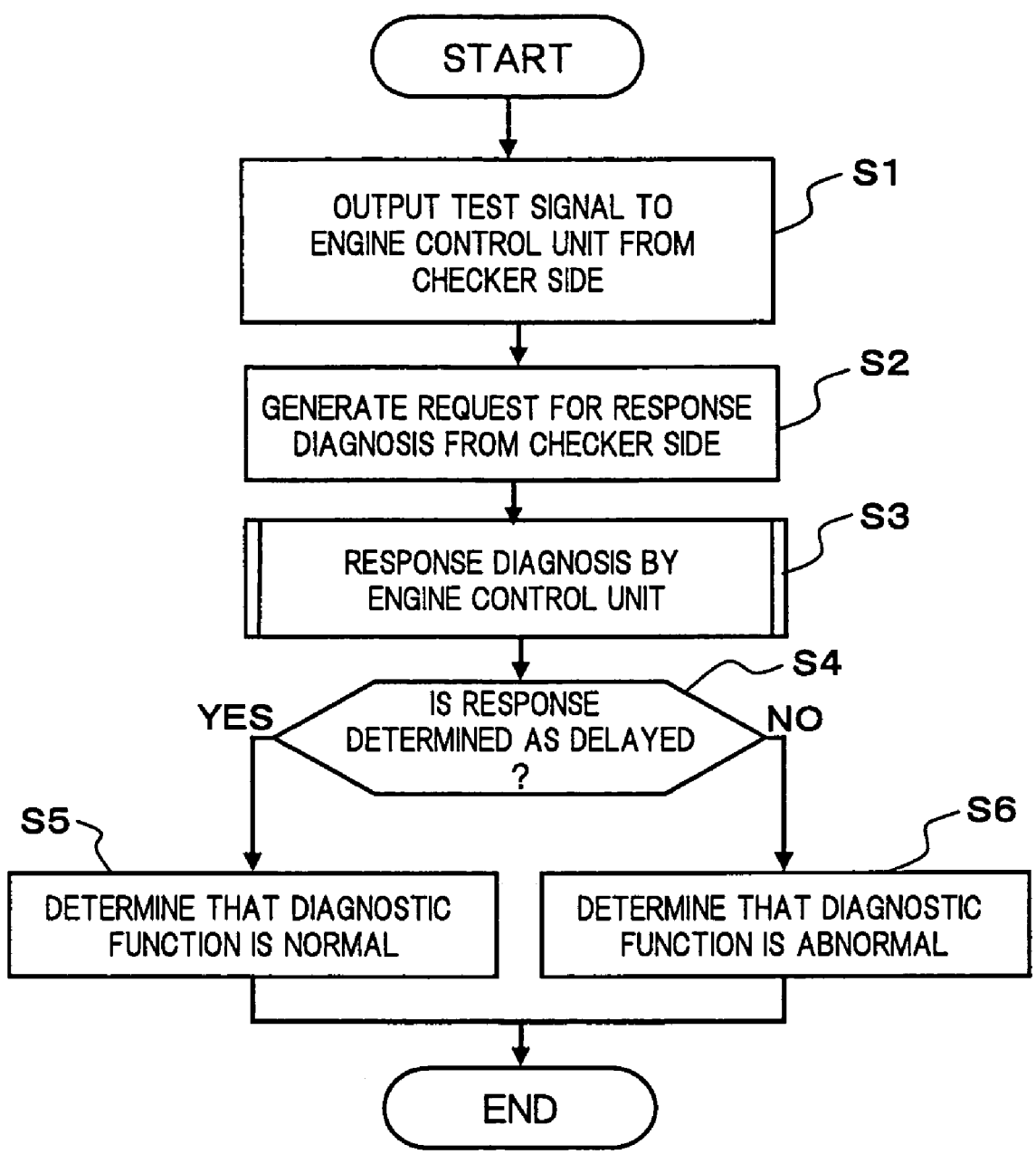
FIG. 8 is a flowchart showing evaluation processing of diagnosis in the embodiment.

When the function of the response diagnosis is to be evaluated, diagnostic function evaluating checker 121 is connected to engine control unit 48 such that intercommunication is established therebetween as shown in FIG. 7, and the evaluation of the diagnostic function is carried out in accordance with a flowchart shown in FIG. 8.

With reference a block diagram shown in FIG. 7, the evaluation processing of the diagnostic function shown in the flowchart in FIG. 8 will be explained below.

In the flowchart in FIG. 8, in step S1, a test signal for reproducing a state where the transient response of the variable valve mechanism is delayed is generated in checker 121 (test signal generator 121a), and the test signal is output to engine control unit 48.

As the test signal, testing engine rotating speed signal Ne and testing cooling water temperature signal Tw used for setting the desired advance angle value in variable valve timing apparatus 109 are generated, and a testing advance angle value signal which changes with slow response characteristics is generated with respect to the change in desired advance angle value which is set based on testing engine rotating speed signal Ne and testing cooling water temperature signal Tw.

The testing advance angle value signal is preset such that the signal shows transient response in which response deterioration is diagnosed with the response diagnosis in engine control unit 48.

In engine control unit 48 to which the test signal is input, the desired advance angle value is set based on the testing engine rotating speed signal and the testing cooling water temperature signal in desired value calculating unit 48a.

In step S2, an execution request signal of the response diagnosis of variable valve timing apparatus 109 is output from checker 121 (test signal generator 121a) to engine control unit 48 (response diagnosing unit 48b).

In engine control unit 48, which receives the execution request signal of the response diagnosis carries out the response diagnosis in step S3 (response diagnosing unit 48b).

Figure 9:
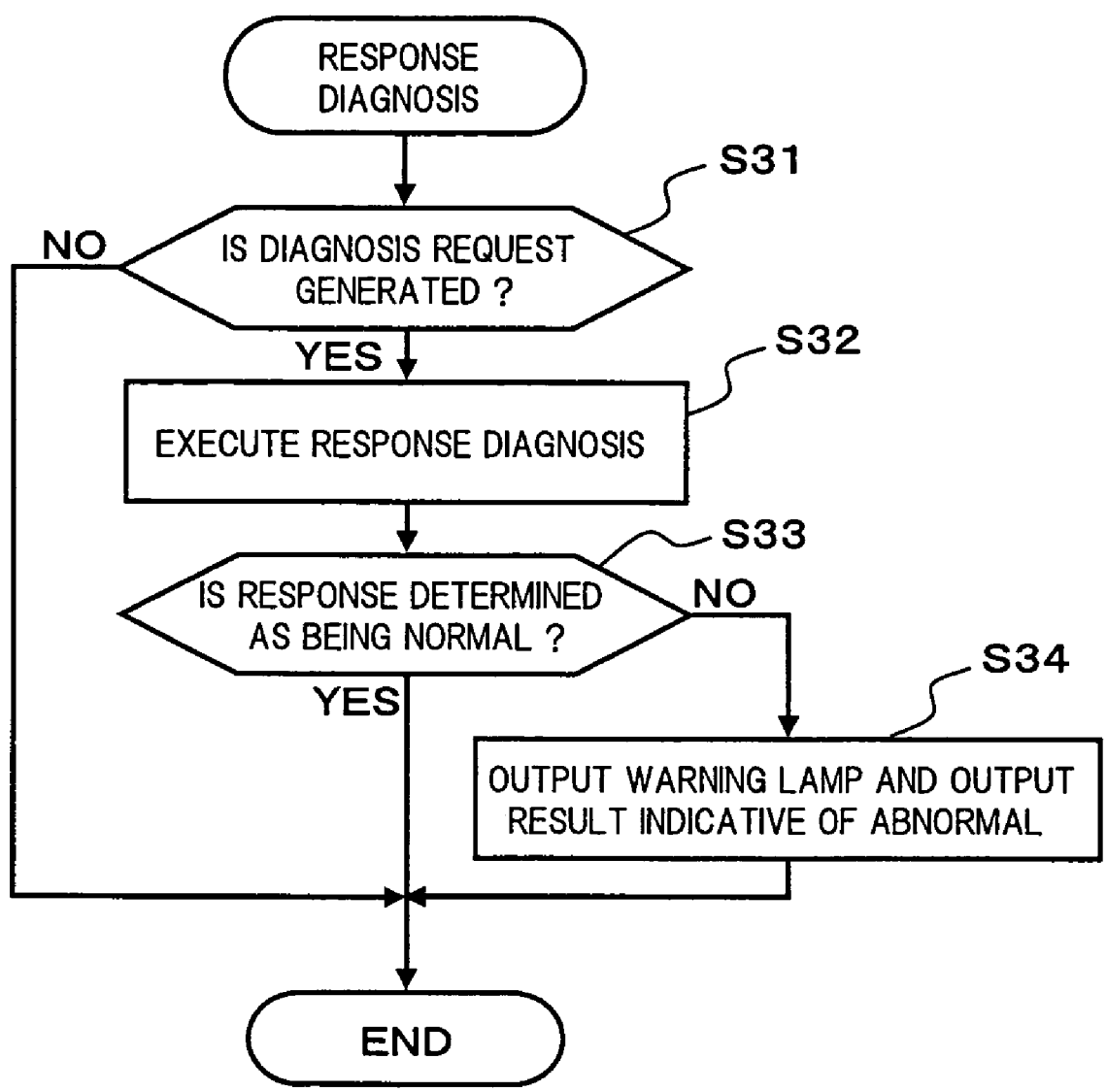
FIG. 9 is a flowchart showing diagnosing processing in the embodiment.

Details of the response diagnosis carried out by step S3 (response diagnosing unit 48b) are shown in a flowchart in FIG. 9.

In step S31, it is determined whether a request for the response diagnosis is generated, and if it is determined that the request for the response diagnosis is generated, the procedure proceeds to step S32.

In step S32, it is determined whether the response of variable valve timing apparatus 109 is deteriorated based on time required until the actual advance angle value is converged into the desired advance angle value after the desired advance angle value is changed in a step manner, duration of a state in which the deviation between the desired advance angle value and the actual advance angle value is equal to or more than a predetermined value, and changing speed of the actual advance angle value immediately after the desired advance angle value is changed in the step manner.

The desired advance angle value in the response diagnosis is a value which is set based on the testing engine rotating speed signal and the cooling water temperature signal, and the testing advance angle value signal is used as the actual advance angle value.

In step S33, as a result of the response diagnosis, it is determined whether the response of variable valve timing apparatus 109 is diagnosed as being normal.

If it is determined that the response is deteriorated, the procedure proceeds to step S34, where a warming lamp for alerting the user to the response deterioration (trouble of variable valve timing apparatus 109) is lit and a diagnosis result of the response deterioration is output.

Additionally, the result of the response diagnosis in engine control unit 48 is sent to checker 121 (response diagnosis evaluating unit 121b).

Checker 121 to which the result of the response diagnosis in engine control unit 48 is input determines whether the response of variable valve timing apparatus 109 is deteriorated in step S4 in the flowchart in FIG. 8.

The response of the testing advance angle value signal with respect to the desired advance angle value based on the testing engine rotating speed signal and the cooling water temperature signal is set such that the response deterioration is diagnosed in the response diagnosis. Thus, the response deterioration is diagnosed if the function of the response diagnosis is normal.

Thus, if it is determined that the response is normal, it is possible to determine that the diagnostic function is abnormal.

Hence, when it is determined that the response is deteriorated, the procedure proceeds to step S5 from step S4, it is determined that the response diagnosis functions normally, and an evaluation result thereof is output.

The evaluation result is output as display of characters "diagnostic function is normal" on screen 121c of the checker 121.

On the other hand, if it is not determined that the response is deteriorated, this means that even though the testing advance angle value signal shows response deterioration with respect to the desired advance angle value based on the testing engine rotating speed signal and the testing cooling water temperature signal, the response is determined as being normal as a result of the diagnosis. Hence, the procedure proceeds to step S6 from step S4, it is determined that the diagnostic function is abnormal, and such evaluation result is output.

The evaluation result is output as display of characters "diagnostic function is abnormal" on screen 121c of the checker 121.

With this, the abnormal condition of the diagnostic function is detected, and the diagnostic function can be recovered, and the reliability of the diagnostic function can be enhanced.

In checker 121, the testing desired value signal is generated, in engine control unit 48, response diagnosis is carried out based on correlation between the testing desired value signal and the testing advance angle value signal, and diagnostic function can be evaluated in checker 121 from the result of the response diagnosis.

The variable valve mechanism is not limited to the hydraulic pressure type variable valve timing apparatus 109. The variable valve mechanism may be of a structure in which a rotation phase of a camshaft is changed with respect to a crankshaft by friction brake of an electromagnetic clutch (electromagnetic brake) disclosed in JP-A No. 2001-164951 and JP-A No. 10-153104, or may be of a structure in which a control shaft is turned by a motor, and a valve lift amount of an engine value is continuously changed together with the operation angle as disclosed in JP-A No. 2001-012262.

In checker 121 connected to engine control unit 48, a state in which the transient response is delayed is reproduced in engine control unit 48 instead of generating a test signal. Thus, the test signal can be generated.

The entire contents of Japanese Patent Application NO. 2004-334726, filed Nov. 18, 2004 are incorporated herein by reference.

While only selected embodiments have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

I claim:

1. A method of evaluating a diagnostic function to diagnose a transient response of a variable valve mechanism, which varies operating characteristics of an engine valve, comprising the steps of:
   generating a test signal for reproducing a state in which the transient response of the variable valve mechanism is delayed;
   executing the diagnosing function for diagnosing the transient response of the variable valve mechanism in the state of the delayed transient response of the variable valve mechanism, which is reproduced based on the test signal; and
   evaluating the diagnostic function of the transient response based on a result of the execution of the diagnosing function.

2. The evaluating method according to claim 1, wherein the step of generating the test signal comprises the step of generating, as the test signal, a controlled variable signal indicative of a controlled variable of the variable valve mechanism, and wherein
   the step of executing the diagnosing function for diagnosing the transient response comprises the step of diagnosing the transient response of the variable valve mechanism based on the generated controlled variable signal for testing and a desired value.

3. The evaluating method according to claim 1, wherein the step of generating the test signal comprises the step of generating, as the test signal, a position signal indicative of a position of a controlled system of the variable valve mechanism, and
   wherein the step of executing the diagnosing function for diagnosing the transient response comprises the step of diagnosing the transient response of the variable valve mechanism based on the generated position signal for testing and a desired value.

4. The evaluating method according to claim 2, wherein the step of generating the test signal comprises the step of generating, as the test signal, the controlled variable signal as well as an operation condition signal which indicates an operation condition of an internal combustion engine, and
   wherein the step of executing the diagnosing function for diagnosing the transient response comprises the step of diagnosing the transient response of the variable valve mechanism based on a desired value which is set on the basis of the testing operation condition signal and the testing controlled variable signal.

5. The evaluating method according to claim 4, wherein the step of generating the test signal comprises the step of generating an engine rotating speed signal as the operation condition signal for testing.

6. The evaluating method according to claim 4, wherein the step of generating the test signal comprises the step of generating a cooling water temperature signal as the operation condition signal for testing.

7. The evaluating method according to claim 2, wherein the step of executing the diagnosing function for diagnosing the transient response includes the steps of measuring a time required for the controlled variable signal for testing to be converged into a desired value, and diagnosing the transient response of the variable valve mechanism based on the time.

8. The evaluating method according to claim 2, wherein the step of executing the diagnosing function for diagnosing the transient response includes the steps of:
   calculating a deviation between the controlled variable signal for testing and a desired value;
   measuring a time during which a state in which the deviation is equal to or more than a predetermined value continues; and
   diagnosing the transient response of the variable valve mechanism based on the measured time.

9. The evaluating method according to claim 1, wherein the step of evaluating the diagnostic function determines that the diagnostic function for diagnosing the transient response is abnormal when the transient response of the variable valve mechanism is diagnosed as being normal by the execution of the diagnosing function for the transient response.

10. The evaluating method according to claim 1, wherein the step of generating the test signal is executed by an external checker arranged to be connected to a control unit of the variable valve mechanism, and
   wherein the step of executing the diagnosing function for diagnosing the transient response is executed by the control unit arranged to receive a test signal generated by the checker.

11. The evaluating method according to claim 10, wherein the step of executing the diagnosing function for diagnosing the transient response is executed by the control apparatus of the variable valve mechanism, the control unit outputting a signal indicative of a result of diagnosis to the external checker.

12. An evaluation apparatus for evaluating diagnosing function for diagnosing a transient response of a variable valve mechanism adapted for changing operating characteristics of an engine valve; comprising:
   a signal generator that generates a test signal for reproducing a state in which the transient response of the variable valve mechanism is delayed;
   a diagnosing unit that has a function to diagnose the transient response of the variable valve mechanism in the state of the delayed transient response of the variable valve mechanism, which is reproduced based on the test signal; and
   an evaluating unit that evaluates the function of diagnosing the transient response of the variable valve mechanism based on a result of the diagnosis by the diagnosing unit.

13. The evaluation apparatus according to claim 12, wherein the signal generator generates, as the test signal, a controlled variable signal indicative of a controlled variable of the variable valve mechanism, and wherein the diagnosing unit diagnoses the transient response of the variable valve mechanism based on the controlled variable signal for testing and a desired value.

14. The evaluation apparatus according to claim 12, wherein the signal generator generates, as the test signal, a position signal indicative of a position of a controlled system of the variable valve mechanism, and wherein the diagnosing unit diagnoses the transient response of the variable valve mechanism based on the testing position signal and a desired value.

15. The evaluation apparatus according to claim 13, wherein the signal generator generates, as the test signal, the controlled variable signal as well as an operation condition signal indicative of an operation condition of an internal combustion engine, and wherein the diagnosing unit diagnoses the transient response of the variable valve mechanism based on a desired value which is set on the basis of the operation condition signal for testing and the controlled variable signal for testing.

16. The evaluation apparatus according to claim 15, wherein the signal generator generates an engine rotating speed signal as the testing operation condition signal.

17. The evaluation apparatus according to claim 15, wherein the signal generator generates a cooling water temperature signal as the operation condition signal for testing.

18. The evaluation apparatus according to claim 13, wherein the diagnosing unit measures a time required for the control variable signal for testing to be converged into a desired value, and diagnoses the transient response of the variable valve mechanism based on the measured time.

19. The evaluation apparatus according to claim 13, wherein the diagnosing unit measures a time during which a state in which a deviation between the control variable signal for testing and the desired value is equal to or larger than a predetermined value continues, and diagnoses the transient response of the variable valve mechanism based on the measured time.

20. The evaluation apparatus according to claim 12, wherein the evaluation unit determines that the function to diagnose the transient response of the variable valve mechanism is abnormal when the transient response of the variable valve mechanism is diagnosed as being normal as a result of the diagnosis of the transient response.

21. The evaluation apparatus according to claim 12, wherein the signal generator is provided in an external checker, which is connected to a control unit of the variable valve mechanism, the control unit receiving a test signal generated by the checker.

22. The evaluation apparatus according to claim 12, wherein the diagnosing unit is provided in a control unit of the variable valve mechanism, the control unit outputting a signal indicative of a result of diagnosis to an external checker.

* * * * *